United States Patent
Heijne et al.

(10) Patent No.: US 8,168,953 B2
(45) Date of Patent: May 1, 2012

(54) METHOD, APPARATUS AND COMPUTER PROGRAM FOR MEASURING THE DOSE, DOSE RATE OR COMPOSITION OF RADIATION

(75) Inventors: Erik Henricus M. Heijne, Val d'Illiez (CH); Stanislav Pospisil, Praha 4/Chodov (CZ)

(73) Assignees: CERN-European Organization for Nuclear Research, Geneva (CH); Czech Technical University of Prague (CZ)

( * ) Notice: Subject to any disclaimer, the term of this patent is extended or adjusted under 35 U.S.C. 154(b) by 0 days.

(21) Appl. No.: 13/113,521

(22) Filed: May 23, 2011

(65) Prior Publication Data

US 2012/0006991 A1    Jan. 12, 2012

Related U.S. Application Data

(63) Continuation of application No. 12/241,630, filed on Sep. 30, 2008, now abandoned, and a continuation of application No. PCT/EP2007/002105, filed on Mar. 9, 2007.

(51) Int. Cl.
    *G01T 1/02*      (2006.01)
(52) U.S. Cl. ................................. 250/370.07
(58) Field of Classification Search ............. 250/363.01, 250/370.03, 370.06, 370.07, 370.1
    See application file for complete search history.

(56) References Cited

U.S. PATENT DOCUMENTS 5,596,199 A    1/1997    McNulty et al.

OTHER PUBLICATIONS

Granja, C., et al., "Position-sensitive spectroscopy of 252Cf Fission fragments," Nuclear Instruments & Methods in Physics Research, Section—A: Accelerators, Spectrometers, Detectors and Associated Equipment, Elsevier, Amsterdam, NL [Online], vol. 574, No. 3, Feb. 8, 2007, pp. 472-478.*

Llopart, X., et al., "Medipix2: a 64-k Pixel Readout Chip With 55-micrometer Square Elements Working in Single Photon Counting Mode", IEEE Transactions on Nuclear Science, vol. 49, No. 5, Oct. 2002, pp. 2279-2283.*

"The MEDIPIX2 and TIMEPIX Detectors"; L.S. Pinsky and E.V. Hungerford; University of Houston; Jan. 19, 2007.

"MEDIPIX: A CERN Technology That Can Be Developed Into an Active Real-Time Space Radiation Dosimeter"; J. Chancellor; Jan. 13, 2007. "Development of a New Active Personal Dosimeter for Use in Space Radiation Environments"; L.S. Pinkey and j. Chancellor; Mar. 10, 2007.

"Development of a New Active Dosimeter for Use in Space Radiation Environments"; L. Pinsky, J. Chancellor, D. Minthaka; May 4, 2007.

"MEDIPIX: A CERN Technology That Can Be Developed Into an Active Real-time Space Radiation Dosimeter"; L. Pinsky; Apr. 6, 2006.

"Medipix in the Space Radiation Environment"; L. Pinsky and Allan Lan; Dec. 8, 2005.

* cited by examiner

*Primary Examiner* — Mark R Gaworecki
(74) *Attorney, Agent, or Firm* — Duane Morris, LLP

(57) ABSTRACT

A method and an apparatus for measuring the dose, the dose rate and/or the composition of radiation is disclosed. In the method, a detector means is exposed to a radiation environment, the detector means comprising an array of radiation sensing detector elements. The detector means is switched in a sensitive state for the duration of a sensitive time period, and during said sensitive time period, an interaction pattern generated by individual radiation quanta interacting with one or more of the detector elements is recorded. The duration of the sensitive time period can be precisely adapted to the intensity of the radiation that has to be recorded. The interaction pattern is analyzed to distinguish individual radiation quanta received during the sensitive time period, and a radiation category is assigned to each of the distinguished radiation quanta based on its corresponding interaction pattern. A dose, a dose rate and/or a composition of radiation is then computed from the detected and categorized radiation quanta. Weight factors are attributed to each radiation category to take into account the individual degree of damage which the corresponding category can inflict in the irradiated materials.

37 Claims, 7 Drawing Sheets

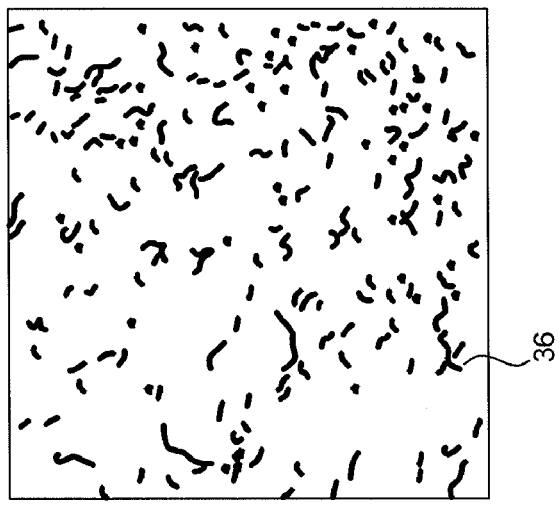
Fig. 7
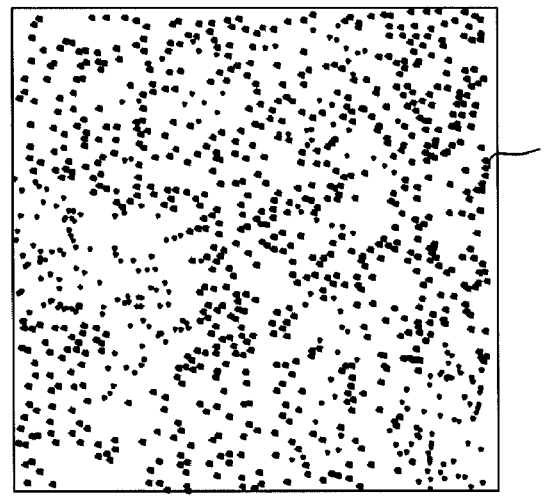
Fig. 6
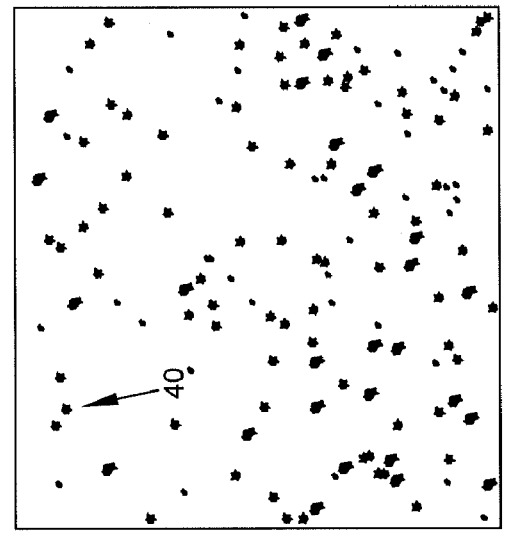
Fig. 5
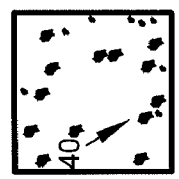

| Radiation quantum category name | real particle and approximate energy | characteristic pixel pattern | signature curvature | curvature magnetic field | typical energy deposition [keV] | effects of signal thresholds increase |
|---|---|---|---|---|---|---|
| alpha | ionized He few MeV | "blob" size: 4-40p | closed | no | 5000 | blob smaller |
| beta | electron, positron <MeV | curled "worm" size: 5-8p | curly | yes | 10 - 600 | shorter curl |
| gamma<600 | nuclear photon <600keV (photon itself invisible) | conv. electron (ce) / slightly curled 10-30p | curly | yes | 50 - 600 | shorter curl |
| gamma>600 | nuclear photon >600keV (photon itself invisible) | conv. electron or pair long trail (1p wide) | slightly curved | yes | 50 - 5000 | trail intermittent |
| delta | knock-on electron <MeV | short trail, size:3-10p | curly | yes | 4 - 1000 | trail intermittent |
| X-ray photon | photon atomic origin | (see below) | — | no | conversion, invisible | disappears |
| photon<20 | 2 - 20 keV | ce point, size: 1-3p | closed | ce yes | 2 - 20 | disappears |
| photon<150 | 20 - 150 keV | ce "worm", size: 4-15p | curly | ce yes | 20 - 150 | shorter or disappears |
| photon<1000 | 150 - 1000 keV | ce 1p wide trail, size:10-50p | curved | ce yes | 150 - | trail intermittent |
| photon >M | > 1000 keV, indirect | ce cp, rare | slightly curved | ce yes | > 500 | trail intermittent |
| light ion | ionized atom >5MeV | 2-3p wide "cone" | cone | no | >5000 | cone smaller |
| heavy ion-a | knock-on atom (1+) MeV | "blob", size: 10-30p | closed | no | < 5000 | blob smaller |
| heavy-ion-b | ionized atom>20MeV | 2-3p wide stub, size: 10-40p | stub | no | > 20 000 | stub smaller |
| fis- fragment | nucleus 60-200 MeV (1+) | blob, size: 30-100p | closed | no | > 100 000 | blob smaller |
| proton<M | proton < 1 MeV | 1-2p wide cone; size:2-3p | cone | no | 10 - 1000 | cone smaller |
| proton>M | proton > 1 MeV | 2-3p wide stub | stub | no | > 1000 | stub smaller; narrower |
| profon-mip | proton > 200 MeV | 1-2p wide trail | straight | no | 10 - 5000 | trail intermittent |
| neutron<k | neutron < 100 keV | point; size: 1-2p | closed | no | 10 - 100 | disappears |
| neutron<M | neutron <1 MeV | blob, size: 3-6p | closed | no | 100 - 1000 | blob smaller |
| neutron>M | neutron > 1 MeV | cone 6-40p | cone | no | >1000 | cone smaller |
| n-interaction | particles from vertex | star | star | no | 1000 - 100 000 | ~same |
| mip | any minimum ionizing | long, 1p wide tail | straight | little | 400 - 5000 | trail intermittent |
| muon-mip | muon | long, 1p wide straight | straight | little/no | 400 - 5000 | trail intermittent |

Fig. 9

METHOD, APPARATUS AND COMPUTER PROGRAM FOR MEASURING THE DOSE, DOSE RATE OR COMPOSITION OF RADIATION

RELATED APPLICATIONS

The instant application is a continuation application of and claims the priority benefit of U.S. application Ser. No. 12/241,630, filed Sep. 30, 2008 now abandoned which was filed under 35 U.S.C. §371 and was a continuation of and claimed the priority benefit of International Patent Application No. PCT/EP2007/002105 filed on Mar. 9, 2007 by the same named inventors, the entirety of which are hereby incorporated by reference.

FIELD OF THE INVENTION

The present invention relates to a method, an apparatus and a computer program for measuring a dose, a dose rate and/or a composition of radiation.

BACKGROUND OF THE INVENTION

In the present document, the term "dose" if not further specified may relate to either "energy dose" or "equivalent dose". The energy dose is equal to the energy deposited per unit mass of a medium and is measured in units of J/kg, which is denoted as Gray (Gy). However, the biological effect of radiation can not be estimated by the energy dose only. Heavy particles are in general more harmful than an identical dose of X-ray, gamma or beta radiation. With regard to the human body, this is accounted for by a quality factor or radiation weighting factor denoted as $w_r$, which compares the relative biological effects of various types of radiation. Accordingly, an equivalent dose is defined by the product of the energy dose and the weighting factor $w_r$, and it is measured in units called Sievert (Sv). The quality factors $w_r$ range from 1 for X-ray, gamma and beta radiation, 10 for alpha particles up to 20 for heavy nuclei. In dosimetry, it is therefore usually not sufficient to simply measure the energy dose but it is also necessary to somehow distinguish the contributions of different types or categories of radiation of the radiation environment.

The oldest way of measuring radiation dose is based on blackening of silver grains in a sensitive emulsion, which requires development of the film and subsequent measurement of the blackening. An advantage of the emulsion is the visible difference in ionization and track characteristics for different types of radiation, such as alpha particles, heavy ions, cosmic muons or electrons. This blackening of silver grains in a sensitive emulsion is an example of a passive detector, which is exposed to radiation and afterwards analyzed to determine the absorbed dose. Other well known examples for passive detectors are thermo luminescent detectors, alanine detectors, gel and radio-photo luminescent detectors, and also track-sensitive plastic detectors. Passive detectors do not allow time resolved measurements. Also, passive detectors accumulate background before and after the intended exposure itself, and some of them are subject to fading.

On the other hand, there are known active detectors which have the ability of time resolved measurement which is in many applications a desired feature. In an active detector, generally some electrical current signals resulting from an ionization process caused by ionizing radiation in a suitable detector material such as a gas or semiconductors are analyzed.

A typical active detector using gas as the sensitive material is the ionization chamber, which is frequently used nowadays, for example in the Geiger-Mueller-Counter. An example for a semiconductor sensitive material is a Si-diode, which is used in some commercially available dosimeters. Both examples of active detectors allow to a certain extent the evaluation of the linear energy transfer (LET) spectra.

As mentioned above, for an assessment of the equivalent dose, one has to distinguish radiation according to both, type and energy. As long as the composition of the ionizing radiation is not determined, it remains a difficult issue of calibration to convert a measured electrical signal into an equivalent dose or effective biological damage factor, such that simple dosimeters have a problem of giving an imprecise estimate of the equivalent dose. On the other hand, known spectroscopy techniques for distinguishing radiation according to type and energy require different varieties of detectors and lead to complicated, bulky and expensive apparatuses. When it comes to determining the biological damage factor using traditional measurement equipment, this can currently only be achieved to some degree by use of mechanical filters at the entrance of the measurement apparatus, and at the costs of added complexity and loss of sensitivity.

Recently, new active electronic methods have been developed that use the change of transistor characteristics under ionizing irradiation which have some proportionality to the energy dose and that allow remote measurements in various environments, cf. for example "Handbook of Radiation Effects", $2^{nd}$ edition, Andrew Holmes-Siedle and Len Adams, Oxford University Press, ISBN 0-9-850733-X. However, these methods do not resort to the quantum nature of radiation and do not allow to determine the components of the radiation.

An even more recent development has been the measurement of alpha particle radiation emitters such as gaseous radon by the use of a highly segmented semiconductor imager device, as shown in "First measurement of 222Rn activity with a CMOS active pixel sensor", A. Nachab et al., Nucl. Instr. Meth. B 225 (2004), pages 418-422. This work has some similarity with the method of the invention. However, until now a charge coupled device (CCD) or a monolithic CMOS active imager accumulates signal charge in a pixel over a relatively long period and the integration time window is not the same for all pixels in the matrix. These devices do not provide signal processing in the pixels and background charge can not be eliminated. The use for radiation measurements is very limited because only some types of radiation can be recognized. A monolithic active pixel dosimeter is known from US 2006/0043313.

Until now, detectors used for dosimetry or radiation protection purposes are not able to determine all the necessary information needed for measuring an equivalent dose. In particular, known detectors and measuring methods do not allow to obtain the composition of the radiation field and LET values with the desired precision.

The object of the invention is to provide a method and an apparatus for measuring the dose, the dose rate and/or the composition of radiation with higher accuracy and with a more economic effort in equipment and time.

SUMMARY OF THE INVENTION

The method of the invention comprises the steps of exposing a detector means comprising an array of detector elements to a radiation environment, switching the detector means in a sensitive state for the duration of a sensitive time period, during said sensitive time period, recording an interaction pattern generated by individual radiation quanta interacting with one or more of the detector elements, analyzing the interaction pattern to distinguish individual radiation quanta received during said sensitive time period, assigning a radiation category to each of the distinguished radiation quanta based on its corresponding interaction pattern and computing a dose, a dose rate and/or composition of radiation from the detected and categorized radiation quanta. Herein, the interaction pattern may be an energy deposition pattern of energy deposited in one or more of the detector elements upon interaction of individual radiation quanta interacting with said one or more detector elements.

The invention uses the fact that different types of radiation will lead to different interaction patterns when encountering the detector means. For example, a single photon of energy less than 20 keV will typically deposit all of its energy in one detector element or, depending on the size of the detector elements a small number of detector elements that are adjacent to each other in the array of detector elements. In contrast, alpha particles will deposit their energy in a larger cluster of adjacent detector elements, and cosmic particles such as muons or pions will deposit their energy by linear energy transfer in a large number of detector elements arranged along a straight line. By using pattern recognition, individual radiation quanta can be identified and categorized according to a predetermined number of radiation categories. Accordingly, during the same sensitive time period, both the deposited energy and the category of radiation can be determined for each incident radiation quantum which allows for an assessment of the composition of the radiation environment and for a precise calculation of the equivalent dose or dose rate.

The above mentioned sensitive time period can be regarded as an "exposure" or "open shutter" time, such that one can think of snap shots being taken of the radiation field. This is necessary for recording individual radiation quanta by their interaction patterns. However, this also allows for a very precise measurement of the dose rates, which are defined by the total dose of radiation received by the detector means during a number of sensitive time periods divided by the sum of the respective time periods. What is more, by choosing the sensitive time period, the sensitivity of the measurement can be adjusted. That is, if the dose rate is very high, the sensitive time period can be chosen very short, and when the dose rate is very low, the sensitive time period can be chosen to be very long. Accordingly, the method allows for measuring radiation fields with the same precision throughout a large range of radiation intensities, such as seven orders of magnitude in an exemplary embodiment shown below.

In a preferred embodiment, the step of recording the interaction pattern comprises generating a pixelized image, where each pixel of the image corresponds to one of the detector elements. Moreover, the method further preferably comprises a step of determining an energy estimate of the total deposited energy for each of the detected radiation quanta. Herein, the expression "energy estimate" can mean precise measurement of the deposited energy as well as a less precise assessment of the energy, such as a measurement which only measures whether the energy exceeds some threshold or lies within an energy window. From the deposited energy and knowledge of the detector characteristics, a contribution of each radiation quantum to the energy dose can be determined. Moreover, from the radiation category of the quantum, its contribution to the effective dose can be determined, such as by multiplying the contribution to the energy dose by the corresponding quality factor $w_r$.

In particular, the method may comprise a step of summing the total deposited energy estimates for radiation quanta of the same radiation category and a step of estimating or computing from the sum of energy estimates the contribution of the respective radiation category to the total energy dose and/or dose rate. Moreover, the method may comprise a step of computing the contribution of each radiation category to an effective radiation dose and/or dose rate by multiplying each radiation category's contribution to the total energy dose with a category dependent quality factor. Preferably, an alarm is generated if the dose rate or effective dose rate exceeds a threshold value.

The radiation categories which are assigned to the quanta may comprise one or more of the following categories: photons, beta-particles, alpha-particles, delta-particles, protons, minimum ionizing particles, heavily ionizing energetic ions, fission fragments and neutrons. In addition, one or more of these radiation categories may comprise sub-categories according to energy ranges of the radiation quantum. For example, in the case of photons, one may divide the radiation quantum category "photon" further into three or four energy ranges, as is explained with reference to an embodiment in detail below.

In particular, the step of distinguishing radiation quanta may comprise the recognition of cluster patterns of pixels in the above mentioned pixelized image. A cluster pattern is a set of pixels that have simultaneously detected a discriminated electrical signal as a result of the interaction by a single incident radiation quantum. The pixels in a cluster pattern are mostly adjacent, either horizontal, vertical or diagonal, such that clusters are usually connected. However, pixel gaps may appear within a cluster pattern, either due to a dead pixel, or due to the statistical nature of the energy deposition process, namely if the energy deposited in one pixel cell that would belong to the cluster happens to be below the energy detection threshold.

The recognition of cluster patterns may be based on one or more of the following cluster pattern features: shape, symmetry, curvature, curvature in a magnetic field, total energy deposited in the cluster and energy deposited in individual pixels. In particular, when cluster pattern recognition by shape is performed, this may be based on the recognition of one or more of the following shapes: blob-shape, conic-shape, straight-line-shape, curved-line-shape, curled-line-shape, point-shape, star-shape and stub-shape. Preferred examples are again given below in the context of a preferred embodiment.

Preferably, each detector element generates upon being hit by a radiation quantum an electrical pulse, the size of which is related, in some embodiments proportional to the energy deposited in said detector element. According to one embodiment, the step of determining the deposited energy comprises comparing the electrical pulse with one or both of an upper and lower threshold. This comparison can be quite easily implemented inside each pixel and can be performed very rapidly. The relatively simple implementation allows for a processing of the pulse signal directly at each detector element or pixel of the detector means, and the rapid processing allows for a real time data acquisition and enhanced time resolution.

In a preferred embodiment, the step of determining the deposited energy comprises varying one or both of said lower and upper thresholds between consecutive sensitive time periods. This allows for obtaining an energy distribution or energy spectrum of the radiation quanta for each radiation category.

In one embodiment, the step of determining the deposited energy may comprise digitizing the electrical pulse. This has the advantage that the energy deposited by each radiation quantum can be directly measured from the pulse, however, at the cost of increased hardware resources and data volume, which may often prohibit real time processing. In a preferred embodiment, the step of determining the deposited energy may comprise measuring the duration of a time during which the electrical pulse exceeds a predetermined threshold. Knowing the shape of the pulses and how the pulse width scales with the energy, this time-over-threshold can be used as a very precise measure of the energy while requiring minimal hardware and keeping the generated data amount low.

In a preferred embodiment, each of the detector elements comprises a volume cell of sensor material in which radiation quanta can generate electrical charges, and a read out circuit for detecting the charge in the volume cell and outputting a digital signal in response to the detected charge. Preferably, each read out circuit can be electronically switched between a sensitive state in which electric charges generated in said volume are detected and an idle state, in which said charges are not detected. Accordingly, the sensitive time period of the detector means can be obtained by simultaneously switching each of the read out circuits into a sensitive state. This switching of individual read out circuits can be done at high speed and with a precision of less than a few nanoseconds, such that the duration of the sensitive period may be on the order of a µs. On the other hand, the read out circuits can be controlled to be switched to a sensitive period of tens of seconds or more, which would be suitable for detecting background radiation. Accordingly, by the rapid and precise switching of the read out circuits, a dynamic range of radiation intensities of seven orders of magnitude is obtained, for which doses can be measured with virtually equal precision.

The sensor material may be a semiconductor material selected from group of commonly available materials consisting of silicon, germanium, gallium-arsenide or cadmium-telluride. The volume cell of sensor material may be formed by a portion of a plate of semiconductor material.

The array of detector elements is arranged in a two-dimensional plane, which however need not necessarily be flat. Each of the volume cells is preferably square or hexagonal, and has preferably lateral dimensions of 2 µm to 120 µm, preferably 10 µm to 50 µm in two dimensions lying in said two dimensional plane. This will lead to a resolution which allows to recognize and distinguish interaction patterns for different types of radiation quanta. The dimension in a thickness direction orthogonal to said plane is preferably larger than the in-plane-dimensions and is preferably 100 µm to 1000 µm and preferably 200 µm to 400 µm. A sensitive depth of this order is generally needed to contain a sufficiently long portion of the path of the energy deposition by an energetic radiation quantum before a large fraction of the energy deposition components can escape from the sensitive volume. On the contrary, thin detectors such as CMOS imagers will not contain a sufficient part of an electron path nor can these present a significant conversion volume for energetic X-ray photons. It is however thinkable to equip CMOS imagers with additional conversion layers so that the method could to some extent be implemented.

Alternatively, the sensor material may be a layer of gas or liquid, which is confined above the contacts of the microelectronics readout matrix and with an adequate electrical field applied to this layer, so that generated electrical charge will drift to contacts of the signal processing pixels.

The sensor material may also comprise a layer of scintillating crystal that emits a light pulse after absorbing a radiation quantum. Thereafter the light is detected in the matrix pixels in the semiconductor material.

BRIEF DESCRIPTION OF THE FIGURES

FIG. 5 is an image recorded with the detector of FIG. 2 when exposed to an $^{241}$Am alpha source.

FIG. 6 is an image recorded with the detector of FIG. 2 when exposed to a $^{55}$Fe X-ray source.

FIG. 7 is an image recorded with the detector of FIG. 2 when exposed to a $^{90}$Sr beta source.

FIG. 9 is a table showing criteria for the recognition of radiation quantum patterns.

DETAILED DESCRIPTION OF THE FIGURES

Figure 1:
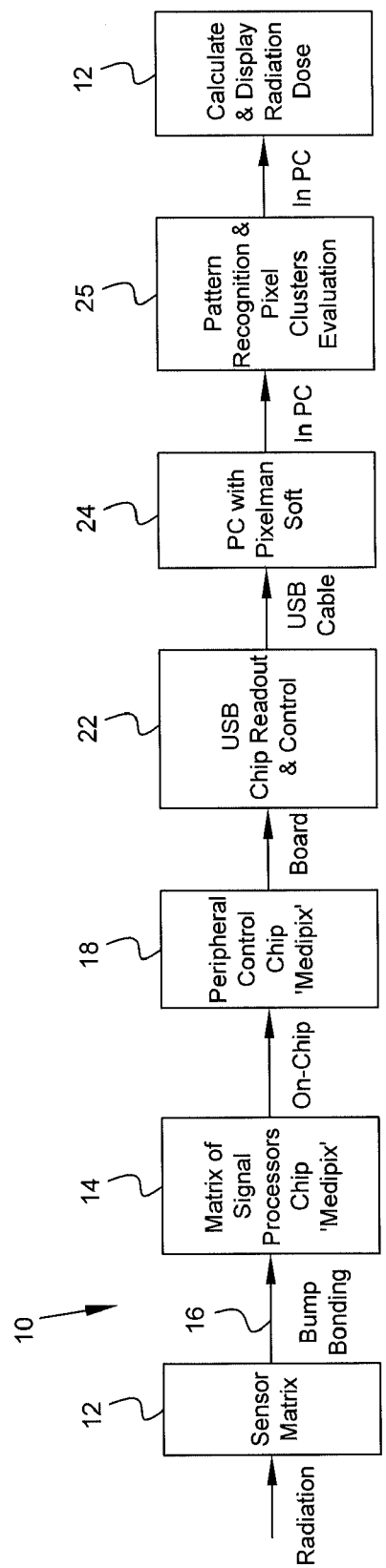
FIG. 1 is a schematic diagram of a hardware chain in the dosimetry method and apparatus of the invention.

For the purposes of promoting and understanding of the principles of the invention, reference will now be made to the preferred embodiment illustrated in the drawings, and specific language will be used to describe the same. It will nevertheless be understood that no limitation of the scope of the invention is thereby intended, such alterations and further modifications in the illustrated device or method and such further applications of a principle of the invention as illustrated therein being contemplated as would normally occur now or in the future to ones skilled in the art to which the invention relates.

FIG. 1 shows a schematic hardware chain illustrating the main components employed in the method and apparatus of the invention. The hardware comprises a detector means 10 comprising a sensor matrix 12 which is bump-bonded by solder bumps 16 with a readout chip 14 (see also FIG. 2). The sensor matrix 12 is a monolithic semiconductor matrix, which can be a plate of semiconductor material such as silicon, germanium, gallium-arsenide or cadmium-telluride. However, another suitable sensitive material such as a volume of solid or gaseous or liquid material in which radiation quanta can generate electrical charges could also be used. The sensor matrix 12 consists of an array of contiguous sensitive adjacent small cells or pixels in the form of a two-dimensional matrix.

Figure 2:
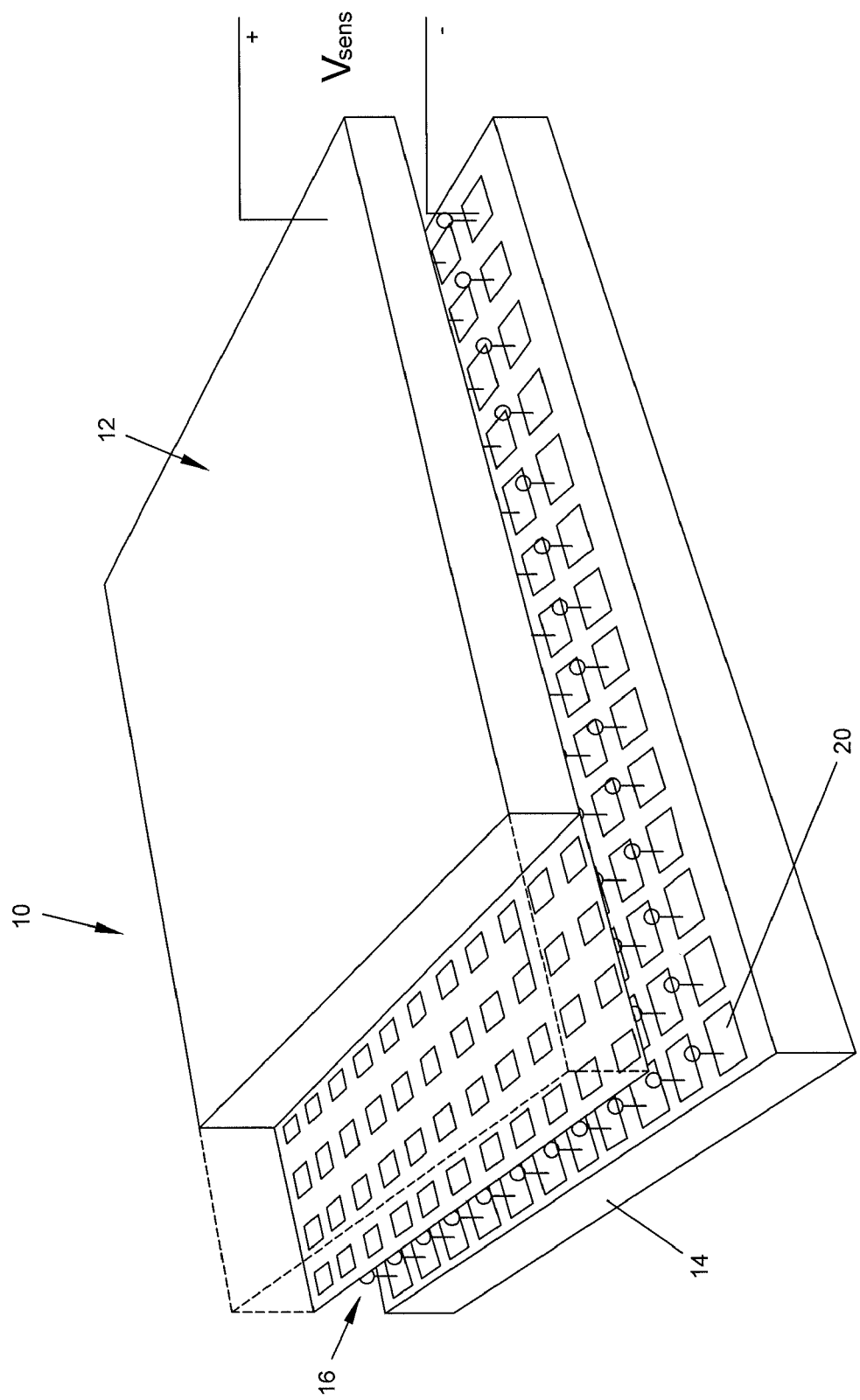
FIG. 2 is a perspective view of a sensor chip and a readout chip forming part of the detector means in an embodiment of the invention.
Figure 3:
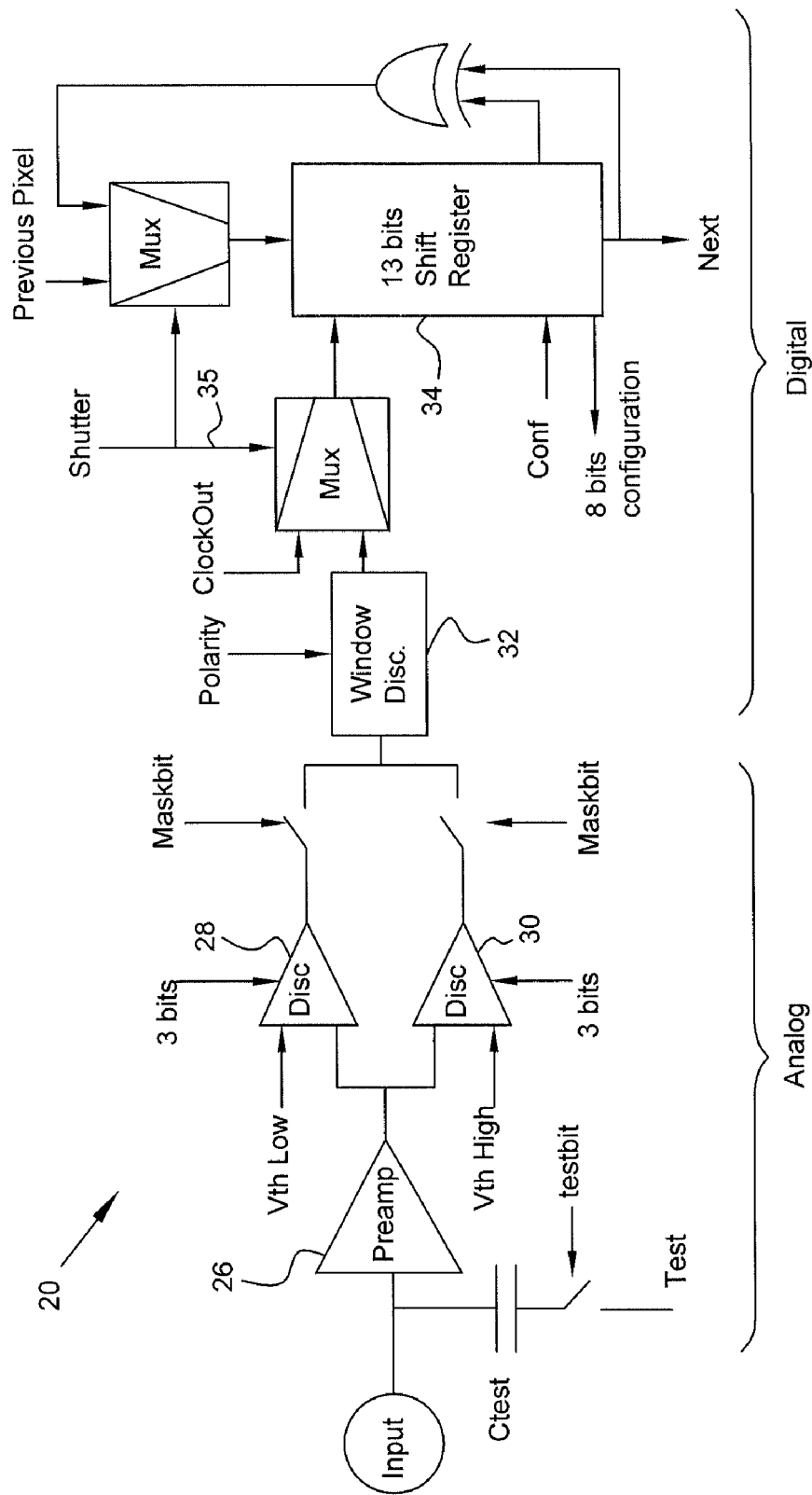
FIG. 3 is a diagram of a readout circuit provided for each pixel of the detector means.

The readout chip 14 has a matching matrix of cells, each cell having a readout circuit 20 as shown in FIGS. 2 and 3 too. A volume cell of the sensor matrix and the corresponding readout circuit constitute an example of a detector element as mentioned above. In the shown embodiment, the readout chip 14 is manufactured in 0.25 µm CMOS technology. In addition to the readout cells, the chip 14 carries peripheral control devices 18 for control of the readout circuit 20.

The sensor matrix may have 64, 128, 256, 512, 1024 or even more pixels in each dimension. The dimensions of the basic pixel cell must be sufficiently small so that radiation quanta with different characteristics deposit energy and therefore generate electrical charge in one or a number of adjacent pixels. A typical dimension is between 10 µm and 50 µm in the two directions in the matrix plane because for such small dimensions different types of radiation quanta generate characteristic patterns of pixel cells with energy deposition and charge generation. In the direction of the thickness of the sensor matrix, the third dimension of the pixel cell is preferably larger such as 200 µm to 400 µm such as to allow inclined ionizing particles to be followed over some distance in the sensor matrix 12. The thickness also must be large in order to present for neutral components of the radiation a sufficient amount of mass for achieving a significant probability of conversion into electrical charge.

An electric field is provided in each individual pixel cell of the sensor matrix 12 in order to collect the electrical charges generated during the incidence or passage of a radiation quantum. On the surface of the sensor matrix 12 facing away from the readout chip 14 (i.e. the upper surface as shown in FIG. 2), a common electrode is provided covering the surface of the whole sensor matrix 12. On the opposite side of the sensor matrix 12 facing the readout chip 14, separated electrodes are provided, one for each pixel cell, which are connected to the corresponding readout circuit. A voltage $V_{sense}$ is applied between the common electrode and each of the segmented electrodes, as is indicated schematically for one of the pixel cells in FIG. 2.

A suitable example for the sensor matrix 12 and the readout chip 14 is the Medipix2 system which is described in detail in the article "Imaging by Photon Counting with 256×256 Pixel Matrix", Lukas Tlustos, Michael Campbell, Erik H. M. Heijne, Xavier Llopart, and Medipix2 collaboration, SPIE Proceedings 5501-10, SPIE Astronomical Telescopes and Instrumentation 2004, Glasgow, 21-25 Jun. 2004, and further references given therein.

With reference to FIG. 1, a USB chip readout and control device 22 is provided on a common board with the detector 10, i.e. on a common board with the sensor matrix 12 and the readout chip 14. The device 22 provides all the hardware needed for the control of the detector 10 and data acquisition from the detector 10. It provides an interface between the readout chip 14 and an USB bus and it also provides a power supply for the detector 10 which is fed by the 5 V USB power line. With this device 22, the detector 10 together with device 22 can be directly connected to a PC 24 without need for supplementary PC data acquisition cards, external power supplies etc. Accordingly, a portable, fully independent apparatus is provided where the entire necessary detector support is integrated in one compact device without any compromises in functionality.

On the PC 24, a specific software is provided for generating pixelized images, such as the software "Pixelman" which has been developed for the above mentioned Medipix2. Further, a specific software for pattern recognition and pixel cluster evaluation, which is generally indicated with reference number 25, is provided on the PC 24.

In FIG. 3 the circuit diagram of the readout circuit 20 is shown. The charge generated in the corresponding sensor cell is input into a preamplifier 26 and is amplified thereby. The amplified signal is fed into two discriminators (comparators) 28 and 30 in which the signal is compared with a low threshold voltage VthLow (discriminator 28) and a high threshold voltage VthHigh (discriminator 30). The logic signals from the discriminators or comparators 28, 30 are processed in a window discriminator 32 which produces an output pulse if the signal exceeds the low threshold and does not exceed the high threshold. Both, the low and the high thresholds can be adjusted by three bit programming, such that the window size and window center can be varied. In some applications it would be sufficient to provide for a lower threshold only.

The pulses from the window discriminator 32 are counted in a 13-bit shift register 34, if the circuit is in a sensitive mode. The sensitive mode of operation, which may also be designated as the "exposure period" or the "shutter-open period", is started when a shutter signal applied to input line 35 goes "low" and is terminated when the shutter signal goes "high". At this point, the circuit switches to a readout mode which uses an external clock, and the same 13-bit register now becomes part of a 256×13 bit column shift register, through which all columns are shifted out in a parallel-serial operation towards the peripheral output circuits. During the readout mode the counting register is electrically separated from the input circuits and while the amplifier and comparator circuits continue to function, the resulting logic signals are not recorded. This mechanism acts as an electronic shutter.

The shutter signal is global for all readout circuits, such that all pixels of the detector 10 can be simultaneously switched into and out of a sensitive state with a precision of a couple of nanoseconds. As mentioned above, this precise and rapid simultaneous switching of all pixels allows for the high precision of dose rate measurement and the large range of radiation intensities that can be handled with the apparatus shown in FIGS. 1 to 3.

It is noted that instead of the energy window provided by the comparators 28, 30 and the window discriminator 32, the readout circuit 20 could be modified to measure the duration of the time that the detected signal exceeds a given threshold. In this scenario, a counter (not shown) could start counting once the signal exceeds the threshold and stop counting as soon as the signal drops below said threshold again. The counter value would then be indicative of the pulse size and thus the deposited energy. The counter value could be input in the shift register 34 and be readout in a similar way as described above. Accordingly, this modification would allow to directly measure the energy of the pulse.

Figure 4:
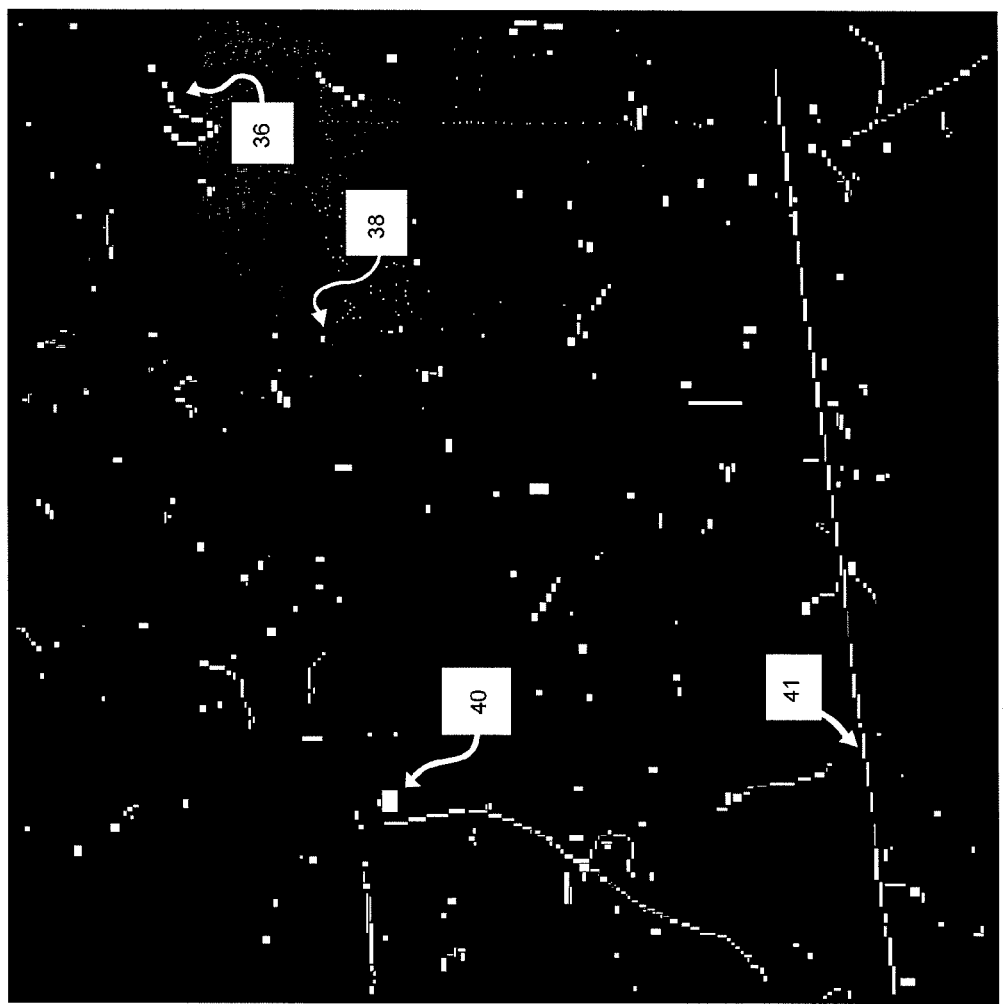
FIG. 4 is an image recorded when the detector of FIG. 2 was exposed to cosmic background radiation.

FIG. 4 shows an image recorded with detector 10 during one sensitive time period, when the detector 10 was exposed to cosmic background radiation. The image was taken with an active area of 14.08 times 14.08 $mm^2$ which consists of 65536 pixel cells. In the image, pixel cells which responded to radiation quanta and for which the energy deposition signal in that pixel fell into the energy window provided by comparators 28, 30 (cf. FIG. 3) at some moments during the sensitive time period are shown in white. All pixels for which no energy deposition signal falling into said energy window was detected are shown in black.

As can be discerned from the figure, characteristic patterns of hit pixels are recognizable. For example, particles such as electrons lead to a strongly scattered "wormlike" path with a length from a few pixels to up to 100 pixels, one of which is denoted by reference number 36 in FIG. 4. Photons, such as X-ray photons or gamma photons of moderate energy (less than 20 keV, for example) typically deposit all their energy in one sensor cell or in a symmetrical cluster consisting of four neighboring pixels at the most. An example of a photon is denoted by reference number 38 in FIG. 4. Reference number 41 denotes the energy deposition pattern of a swift muon which is characterized by a long straight path. Also, an alpha particle interaction, possibly initiated by a neutron and characterized by a solid symmetric cluster of 10 to 30 pixels is shown in the image of FIG. 4 and denoted by reference number 40.

The method of the invention is a quantum dosimetry method in that in calculating a dose, the contributions of individual radiation quanta are summed. Since different types or categories of radiation quanta lead to different characteristic energy deposition patterns, as shown in FIG. 4, using pattern recognition, the detected energy deposition signals of individual pixels can be assigned to a certain category of radiation quanta. Accordingly, the method allows to simultaneously measure the energy dose and the composition of the radiation field, such that an effective dose can be directly measured. Moreover, weight factors can be attributed separately for each component of the radiation with regard to the specific hazardous effects in biological, electronic or other systems.

FIGS. 5 to 7 show further recorded images similar to the image of FIG. 4, except that in these figures pixels that have been encountered by radiation are shown in black and other pixels are shown in white. FIG. 5 shows an image obtained when the detector 10 was exposed to an $^{241}$Am alpha source. When the alpha particles interact with the sensor material 12 of detector 10, this leads to symmetric or nearly symmetric clusters of roughly 25 pixels when measured with the Medipix2 chip having a unit cell of 55 µm×55 µm surface and 300 µm depth. The inset of FIG. 5 shows an enlarged section of the image, in which the cluster patterns can be well recognized. The alpha particle cluster patterns are seen to be "blob-shaped".

FIG. 6 shows an image obtained with the same detector 10 when it was exposed to a $^{55}$Fe X-ray source. As can be seen from FIG. 6, X-ray photons at this resolution yield single pixel hits or at most two adjacent pixels due to charge sharing. So in this case, the cluster patterns are "point-shaped".

Finally, FIG. 7 shows an image obtained with the same detector 10 when it was exposed to a $^{90}$Sr beta source. As can be seen from FIG. 7, beta quanta lead to characteristic energy deposition patterns that wander through a few millimeters in the sensor matrix 12. The cluster patterns are seen to be "curly" or "worm-shaped".

As can be seen from comparison of FIGS. 5, 6 and 7, the resolution of the detector 10 allows to clearly distinguish different types of radiation quanta according to their energy deposition pattern.

In FIGS. 5 to 7, only three radiation categories are distinguished, but the method and the apparatus allow to distinguish a considerably larger number of radiation categories, as will be shown below.

It is noted that while the method of the invention is mainly concerned with distinguishing radiation quanta by their type, the images could also allow to assess the spatial distribution of radiation sources. For example, a small source of radiation, such as a tumor with an increased concentration of radiopharmaceutical could be located in the image if the detector is moved sufficiently close to it. In such a case, at a portion of the matrix closest to the tumor, an increased number of radiation quanta would be detected. On the other hand, if a pin hole is placed in front of the detector matrix, an image of remote radiation sources could be generated in a camera-obscura-like fashion.

Figure 8:
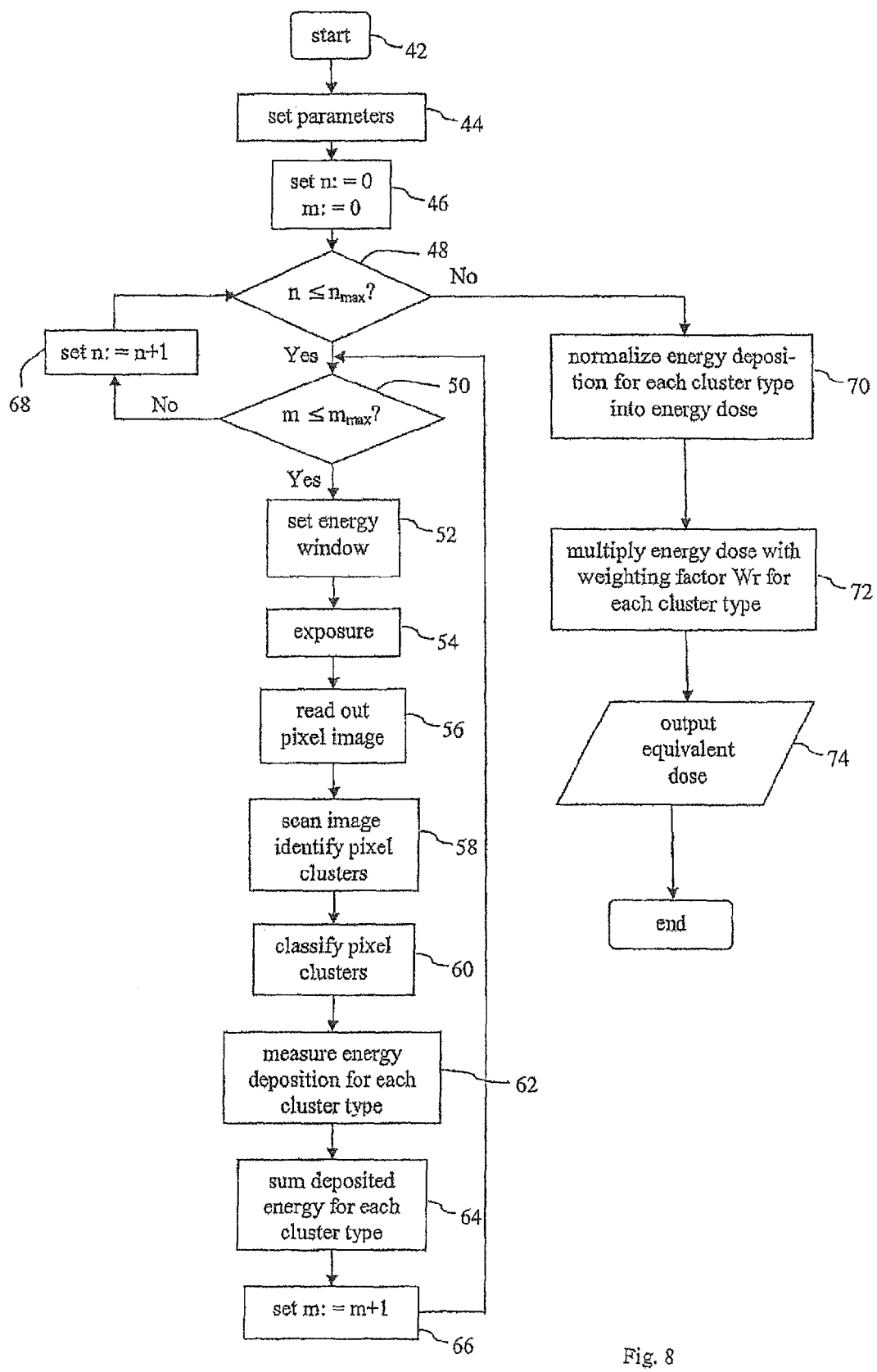
FIG. 8 is a flow diagram illustrating a quantum dosimetry method according to the invention.

In the following, a simple example of a procedure of measuring an equivalent dose is explained with reference to the flow diagram shown in FIG. 8. After starting in step 42, in step 44 different operating parameters are set. One operating parameter to be set is for example the duration of the sensitive time period. The sensitive time period should be long enough such that sufficient radiation quanta are detected therein to make the reading out of the data and processing worth the effort while being short enough that the probability of different energy deposition patterns overlapping with each other is small. That is, the sensitive time period will be adjusted such that the total energy deposited during said sensitive time period will lie within a predetermined range. Other parameters that could be set in step 44 are for example the number k of iterations of sensitive time periods for achieving a desired statistical significance and a selection of those radiation categories which are to be considered.

In step 46, two integer parameters n and m are set equal to 0. In step 48, it is checked whether n is still smaller than a maximum value $n_{max}$. If the answer is yes, this indicates that the data collection is not finished yet and the process proceeds to step 50. In step 50, it is checked whether integer parameter m is still smaller than a maximum value $m_{max}$. If this is the case, the process proceeds to step 52 in which the energy window in each pixel is set. In the case of the readout circuit 20 of FIG. 3, this can be achieved by varying the thresholds VthLow and VthHigh applied to comparators 28, 30, respectively by three bit programming. The energy window chosen could for example be a function of parameter m. That is, for different values of m different energy ranges are detected such that after a number of cycles the energy spectrum of the radiation can be determined.

In step 54 the image is "exposed", i.e. the shutter signal at input line 35 of readout circuit 20 is set from "high" to "low" to set the circuit 20 in a sensitive state for the duration of the sensitive period set in step 44, and is switched from "low" to "high" at the end of the sensitive time period. The shutter signal is global to all pixels, such that all pixels are switched to the sensitive mode simultaneously.

Reading out the pixel image takes place under the peripheral control part 16 of the readout chip 14 and the interface control of device 22 which also controls the transfer of the data via USB connection to PC 24 (cf. FIG. 1). In step 58, the image is scanned and pixel cluster patterns indicative of different radiation categories are distinguished. The scanning and distinguishing of individual radiation quanta is performed on a computer on which a suitable computer program is provided, such as PC 24 shown in FIG. 1. The software employed can for example make use of the software "pixelman" which has already found use in other applications of the Medipix2 detector. Importantly, this analysis can be done by any computer on which the appropriate software is provided. The computer need, however, not be provided with any supplementary PC data acquisition card supporting the data acquisition of the detector 10, which is all provided by the device 22 which is mounted on the same board as the readout chip 14. So in practice, the detector 10 can be included in a small portable and even battery or solar cell operated device which can be connected to any computer anywhere by USB, provided that the suitable software is installed on the computer. In an alternative embodiment, a microcomputer could be provided within the same housing as the detector 10 such that the detection, scanning and dose calculation is performed in a single portable device which could be carried by people subject to the risk of being exposed to excessive radiation.

Once pixel cluster patterns are identified, in step 60 the pixel cluster patterns are classified. That is, a radiation category is assigned to each of the identified pixel cluster patterns. In FIG. 9, a table is shown in which for a number of radiation quantum categories criteria are listed by which the corresponding cluster patterns can be classified. The first column of the table of FIG. 9 lists the radiation quantum categories by name that could be distinguished. For example, the name "alpha" represents an alpha particle. In the second column, the corresponding real particle and the approximate energy is listed. In the case of the alpha radiation quantum, the particle would be ionized He and the energy would be a few MeV.

In the third column, the characteristic pixel pattern is defined. In the example of the alpha particle, the characteristic pattern is the "blob" shape shown in FIGS. 4 and 5 at reference number 40. Also in column 3, the size of the cluster pattern is specified. In the case of alpha radiation, the size may be between four and 40 pixels, where pixel is always abbreviated by "p". As can also be seen from column 3 of the table, the characteristic pixel pattern for a beta quantum is the "worm-shape" with a size of 5 to 8p, which had also been shown in FIGS. 4 and 7, and the "point-shaped" cluster pattern corresponding to a photon having an energy of less than 20 keV (called "photon<20" in column 1) with a cluster size of 1 to 3 pixel, which had been shown at reference number 38 in FIGS. 4 and 6. Note that what is detected in the case of a photon is not the photon itself but its corresponding converted electron (ce).

Other characteristic cluster pattern shapes are a "cone-shape" which can for example be found for light ions or protons with an energy of less than 1 MeV. A cone-shape refers to a roughly triangular or "christmas-tree-like" shape where the cluster is narrow at its beginning and widens as the detected particle looses its energy. Another characteristic cluster pattern shape is the "stub-shape" which can be found for example for ionized atoms of more than 20 MeV ("heavy-ion-b").

In the fourth column, the curvature of the cluster pattern is defined. The curvature may be straight, as is for example the case for the muon-minimum ionizing particle ("muon-mip"); "curly", that is curved in two directions, as it is the case for the converted electron of a photon having an energy of about 20 to 150 keV ("photon<150" in column 1), "curved" in case of converted electrons of higher energy photons of say 150 to 1000 keV ("photon<1000" in column 1), or "slightly curved" for converted electrons of photons having an energy of more than 1 MeV ("photon>M") in column 1.

In the fifth column, the curvature in a magnetic field is defined, and in the sixth column the typically deposited energy is listed. As can be seen from the sixth column, the typically deposited energy varies considerably between different types of radiation quanta. Accordingly, by setting the energy window of the readout circuit 20 of FIG. 3 appropriately, that is by adjusting VthLow and VthHigh, it is possible to selectively detect for radiation quanta within a desired energy band while ignoring others.

Finally, in the seventh and last column, the effects of an increase in the signal threshold VthLow is summarized.

After explaining the overall structure of the table, a few remarks with regard to the radiation quantum categories listed in column 1 shall be made. First of all, the list of radiation categories is meant as an example and not as limiting the invention in any sense. In particular, this list may not be exhaustive and more radiation categories could be distinguished.

Also, some of the radiation categories are divided in sub-categories according to the energy of the radiation quantum. For example, in the case of X-ray photons, there are four sub-categories "photon<20" for energies from 2 to 20 keV, "photon<150" for energies from 20 to 150 keV, "photon<1000" for energies from 150 to 1000 keV and "photon>M" for energies of more than 1 MeV. The number of sub-categories and the exact energy boundaries can be chosen as desired or practical depending on the envisaged use of the method and the apparatus and may therefore deviate from the embodiment shown in the table.

Also, in column 1 a distinction is made between gamma photons and X-ray photons. One usually distinguishes between gamma and X-ray photons by their origin, i.e. gamma photons are generated by nuclear processes whereas X-ray photons are generated by processes in the atomic electron shell. As far as the photon itself and its detection is concerned, there is of course no difference between gamma and X-ray photons of same energy, such that a distinction can not be made without a priory knowledge of the source of radiation. So in many practical applications where there is an unknown radiation field and where the equivalent dose has to be measured, a distinction between gamma and X-ray photons can not be made and need not be made, since as far as the radiation dose in concerned, their effect is of course the same.

Also, from the cluster pattern alone, one can not distinguish between beta radiation and a converted electron generated by a photon. However, in many applications this will not be necessary, because as far as the equivalent dose is concerned, the quality factor of X-ray and beta radiation is identical such that the contribution to the equivalent dose is also identical. However, in other applications one may use different types of filters which allow to distinguish between X-ray and beta radiation.

So column 1 of the table of FIG. 9 should be regarded as list of radiation quantum categories from which a subset can be chosen for each application according to practical considerations, and it should not be understood in a way that all or even most of these categories should be distinguished in each application of the invention.

Finally, it is noted that neutrons will not be detected directly but for example by distinguishing alpha particles in a portion of the detector matrix 12 which is permanently or removably covered with a converter material that is suitable for generating alpha-particles upon being hit by neutrons and which at the same time shields this part of the detector matrix from the incidence of original alpha particles.

Referring now to FIG. 8 again in step 62 the energy deposited for each cluster type, that is for each category of radiation quanta is measured. In the example of FIG. 8, this measurement simply amounts to counting the number of pixels contained in the cluster and multiplying this number with the mean energy value of the energy window set in step 52.

Next, in step 64 the energy deposited for each cluster type is summed up. This sum corresponds to the total energy deposited by radiation quanta of the respective radiation category during one sensitive period or "snapshot" of the radiation field. In step 66, the integer variable m is raised by one and the process returns to step 50. If in step 50 the value m is still smaller than $m_{max}$, the steps 52 to 64 are repeated except that the energy window will now be set to a different value. If, however, in step 50 it is found that m has reached $m_{max}$, in step 68 the integer parameter n is raised by one and the process proceeds to step 48, in which it is checked whether n is still smaller than $n_{max}$. If the answer is yes, steps 50 to 66 are repeated, which means that more data is collected. If the answer is no, this means that the data acquisition is finished and the process proceeds to step 70.

In step 70, the energy deposition for each cluster type, or radiation category, is normalized into a corresponding energy dose. This normalization is based on the dimensional parameters of the sensor matrix, the sensitive time period and also includes calibrations of the energy deposition which will be dependent on the specific material used for the sensor matrix 12. This calibration can be performed in calibration tests using known radiation fields, such as radiation from known radiation sources with known radiation intensities.

In step 72, the energy dose obtained in step 70 for each cluster type or radiation category is multiplied with the corresponding weighting factor $w_r$ such as to obtain the equivalent dose. The equivalent dose is outputted in step 74 and the procedure ends.

As can be seen from the description above, the method of the invention employs a sequence of pattern recognition, categorization and counting of individual incident radiation quanta on a very precisely defined matrix of detection elements during a very precisely determined time period. The method leads to simultaneous measurement of all types of radiation with the same detector. The method provides the possibility to introduce different hazard weight factors for each type of radiation separately during the same measurement cycle. The method allows measurements over a large range of radiation intensities, and in particular, it can function even at very low dose. The precision with which the radiation dose is established can be improved by increasing the number of iterations that the method is executed, provided that the source of radiation is constant. In case the source of radiation is variable in time, the characteristic changes with time of such a variable source can be established. The precision then depends on the area of the sensor matrix, and a larger area would lead to an improved precision.

Note that if the radiation field is non-isotropic, the dose or dose rate detected with detector 10 shown in FIG. 2 will depend on its orientation. If the dose of an unknown ambient radiation field is to be measured, an apparatus with only one detector 10 could simply be rotated by hand such as to average over different orientations. An improved embodiment could have a larger number of detector chips that are facing in different directions. For example, the detector chips could be arranged as the faces of a cube or on a half-sphere.

Also, the detector 10 could be provided with means for rotating it around two or three axes, which would allow for measuring an angular dependence of the radiation field.

The directional structure of the sensor matrix, with its elongated pixel columns arranged in a large area surface provides a variety of directional information on the source of radiation. In specific circumstances an image can be reconstructed of the source of the radiation, with indication of the category of radiation that is emitted from different points in the source. Note that a rotation operation of the detector would represent an additional loop in the diagram of FIG. 8.

Although the preferred exemplary embodiment is shown and specified in detail in the drawings and the preceding specification, these should be viewed as purely exemplary and not as limiting the invention. It is noted in this regard that only the preferred exemplary embodiment is shown and specified, and all variations and modifications should be protected that presently or in the future lay within the scope of protection of the invention.

What is claimed is:

1. A method of measuring the dose and/or the dose rate of radiation, comprising the steps of:
    exposing a detector means to a radiation environment, said detector means comprising an array of detector elements, wherein each of the detector elements comprises a volume cell of sensor material in which electrical charges can be generated upon interaction with radiation quanta,
    switching the detector means in a sensitive state for the duration of a sensitive time period,
    during said sensitive time period, recording an interaction pattern generated by individual radiation quanta interacting with one or more of the detector elements using a read-out circuit for detecting the charge generated upon interaction with radiation quanta, said read-out circuit being connected to received a signal for switching the read-out circuit between a sensitive state, in which electric charges generated in said volume cell are detected, and an idle state, in which said charges are not detected,
    wherein the step of recording the interaction pattern comprises generating a pixelized image, where each pixel of the image corresponds to one of the detector elements,
    analyzing the interaction pattern to distinguish individual radiation quanta received during said sensitive time period, wherein distinguishing radiation quanta comprises a recognition of cluster patterns of pixels in said pixelized image,
    assigning a radiation category to each of the distinguished radiation quanta based on its corresponding interaction pattern, and
    computing the dose and/or a dose rate of radiation from the detected and categorized radiation quanta, wherein in said step of computing the dose and/or dose rate a quality factor associated with each radiation category is accounted for.

2. The method of claim 1, wherein the interaction pattern is an energy deposition pattern of energy deposited in one or more of the detector elements upon interaction of individual radiation quanta with said one or more detector elements.

3. The method of claim 1, wherein the step of recording the interaction pattern comprises generating a pixelized image, where each pixel of the image corresponds to one of the detector elements.

4. The method of claim 1, further comprising the step of determining an estimate of the total deposited energy for each of the detected radiation quanta.

5. The method of claim 4, further comprising a summation of said total deposited energy estimates for radiation quanta of the same radiation category and a step of estimating or computing from the sum of energy estimates the contribution of the respective radiation category to the total energy dose and/or energy dose rate.

6. The method of claim 5, further comprising a step of computing the contribution of each radiation category to an effective radiation dose and/or dose rate by multiplying each radiation category's contribution to the total dose with a category dependent quality factor.

7. The method of claim 1, further comprising a step of generating an alarm if the dose rate or effective dose rate exceeds a threshold value.

8. The method of claim 1, wherein said radiation categories comprise one or more of the following categories: photons, beta-particles, minimum ionizing particles, alpha-particles, delta particles, protons, heavily ionizing energetic ions, fission fragments and neutrons.

9. The method of claim 8, wherein one or more of said radiation categories comprise sub-categories corresponding to energy ranges of the radiation quantum.

10. The method of claim 8, wherein the step of distinguishing neutrons comprises distinguishing alpha particles in a portion of the detector means covered with a converter material suitable for generating alpha particles upon being hit by neutrons.

11. The method of claim 1, wherein the recognition of cluster patterns is based on one or more of the following cluster pattern features: shape, symmetry, curvature, curvature in a magnetic field, total energy deposited in the cluster and energy deposited in individual pixels.

12. The method of claim 11, wherein the cluster pattern recognition by shape is based on a recognition of one or more of the following shapes: blob-shape, conic-shape, straight-line-shape, curved-line-shape, curled-line-shape, point-shape, star-shape and stub-shape.

13. The method of claim 1, wherein the detector means is rotated between at least some of the sensitive periods such as to record interaction patterns for different orientations of the detector means.

14. The method of claim 1, wherein each detector element upon being hit by a radiation quantum generates an electrical pulse, the size of which is related to the energy deposited in said detector element.

15. The method of claim 14, wherein the step of determining the deposited energy comprises comparing the electrical pulse with one or both of a lower and an upper threshold.

16. The method of claim 15, wherein the step of determining said deposited energy comprises varying one or both of said lower and upper thresholds between consecutive sensitive time periods.

17. The method of claim 14, wherein the step of determining the deposited energy comprises digitizing the electrical pulse.

18. The method of claim 14, wherein the step of determining said deposited energy comprises measuring the duration of a time during which the electrical pulse exceeds a predetermined threshold.

19. The method of claim 1, further comprising a step of adjusting the duration of said sensitive time period based on the radiation intensity of the environment.

20. The method of claim 19, wherein the duration of said sensitive time period is adjusted such that the radiation dose or the total energy deposited during said sensitive time period lies within a predetermined range.

21. The method of claim 1, wherein said switching of the detector means in a sensitive state for said duration of said sensitive time period comprises switching each of the read out circuits simultaneously into a sensitive state.

22. The method of claim 1, wherein said sensor material is a semiconductor material selected from a group consisting of silicon, germanium, gallium-arsenide or cadmium-telluride.

23. The method of claim 1, wherein said sensor volume cell is formed by a portion of a plate of semiconductor material.

24. The method of claim 1, wherein the array of detector elements is arranged in a two-dimensional plane and wherein each volume cell has dimensions of 8 to 120 μm, in two directions lying in said two-dimensional plane, and a dimension in a thickness direction orthogonal to said plane that is larger than said in-plane-dimensions and is in the range of 100 to 800 μm.

25. An apparatus for measuring the dose and/or the dose rate of radiation, said apparatus comprising:
- detector means comprising an array of detector elements, wherein each of the detector elements comprises a volume cell of sensor material in which electrical charges can be generated upon interaction with radiation quanta, and a readout circuit for detecting the charge generated in said volume cell, said detector elements being simultaneously switchable to a sensitive state for the duration of a sensitive period during which interaction of radiation quanta with each of the detector elements is detectable,
- image forming means for forming a pixelized image of said interactions detected during a sensitive period, each pixel of said pixelized image corresponding to one of said detector elements,
- pattern recognition means for recognition of interaction patterns in said pixelized image and assigning one of a predetermined number of radiation categories to each interaction pattern, and
- means for computing a dose and/or dose rate of radiation from the detected and categorized radiation quanta, while accounting for a quality factor associated with each radiation category.

26. The apparatus of claim 25, wherein each readout circuit comprises an amplifier for amplifying the charge generated in said volume cell to yield the pulse signal and at least one pulse height discriminator for discriminating the pulse height of said pulse signal.

27. The apparatus of claim 26, wherein the readout circuit comprises first and second pulse height discriminators connected to form a window for distinguishing pulses with a pulse height lying in between first and second threshold values associated with said first and second discriminators, respectively.

28. The apparatus of claim 26, wherein the threshold value or values of said at least one pulse height discriminator is programmable.

29. The apparatus of claim 25, wherein the readout circuit comprises means for measuring the time during which the pulse signal exceeds a threshold of said at least one pulse height discriminator.

30. The apparatus of claim 25, wherein the readout circuit is connected to receive a signal for switching the readout circuit between a sensitive state, in which electric charges generated in said volume cell are detected, and an idle state, in which said charges are not detected.

31. The apparatus of claim 25, wherein the detector means comprises a monolithic semiconductor sensor comprising a matrix array of sensitive pixel cells, said monolithic semiconductor sensor being coupled with one or several CMOS readout chips having a matching matrix of readout circuits.

32. The apparatus of claim 25, wherein the array of detector elements is arranged in a two-dimensional plane and wherein each volume cell has dimensions of 8 to 120 μm, in two directions lying in said two-dimensional plane, and a dimension in a thickness direction orthogonal to said plane that is larger than said in-plane-dimensions and is in the range of 100 to 800 μm.

33. The apparatus of claim 25, wherein at least a part of the detector elements are covered or coverable by a converter material which upon interaction with neutrons may generate alpha particles, or by a scintillating crystal layer that emits a light pulse after absorbing a radiation quantum.

34. The apparatus of claim 25, wherein the detector means are rotatable around two or three axes.

35. The apparatus of claim 25, wherein the apparatus comprises two or more two-dimensional detector means which are oriented in different directions.

36. A non-transitory computer readable medium, comprising a plurality of modules, said modules for processing pixelized images obtained from a segmentized radiation detector,
- which upon execution of the modules in a processing unit performs a pattern recognition of patterns contained in each of said pixelized images, said patterns being indicative of individual radiation quanta,
- assigns a radiation category to each of the recognized patterns, and
- computes a dose and/or dose rate from the categorized radiation patterns, while accounting for a quality factor associated with each radiation category.

37. The non-transitory computer readable medium of claim 36, wherein the pixels of the image reflect an amount of energy deposited in a corresponding segment of said radiation detector upon interaction with radiation during a sensitive period of said radiation detector.

* * * * *